United States Patent [19]

Carlson et al.

[11] E Patent Number: Re. 33,718

[45] Reissued Date of Patent: Oct. 15, 1991

[54] ACOUSTIC TRANSDUCER WITH IMPROVED ELECTRODE SPACING

[75] Inventors: Elmer V. Carlson, Prospect Heights; Peter L. Madaffari, Elgin, both of Ill.

[73] Assignee: Knowles Electronics, Inc., Itasca, Ill.

[21] Appl. No.: 482,265

[22] Filed: Feb. 16, 1990

Related U.S. Patent Documents

Reissue of:

[64] Patent No.: 4,730,283
Issued: Mar. 8, 1988
Appl. No.: 907,498
Filed: Sep. 15, 1986

[51] Int. Cl.[5] ..... H04R 19/00

[52] U.S. Cl. ..... 367/181; 367/170; 381/191

[58] Field of Search ..... 367/140, 170, 173, 174, 367/181, 188; 381/113, 116, 174, 191; 310/324, 351, 349, 350, 353, 800

[56] References Cited

U.S. PATENT DOCUMENTS

| | | | |
|---|---|---|---|
| 2,425,481 | 8/1947 | Morse | 171/327 |
| 3,588,382 | 6/1971 | Reedyk | 179/100.41 |
| 4,063,050 | 12/1977 | Carlson et al. | 179/111 E |
| 4,234,811 | 11/1980 | Hishida et al. | 310/348 |
| 4,310,906 | 1/1982 | Cantrell, Jr. et al. | 367/181 |
| 4,321,432 | 3/1982 | Matsutani et al. | 179/111 R |
| 4,730,283 | 3/1988 | Carlson et al. | 367/181 |

*Primary Examiner*—Brian S. Steinberger
*Attorney, Agent, or Firm*—Wallenstein, Wagner & Hattis, Ltd.

[57] ABSTRACT

An acoustic transducer with an improved electret assembly mounting for providing spacings between the fixed and movable electrodes, and having as one feature the lowering of the undesired capacitance therebetween.

12 Claims, 1 Drawing Sheet

ACOUSTIC TRANSDUCER WITH IMPROVED ELECTRODE SPACING

Matter enclosed in heavy brackets [ ] appears in the original patent but forms no part of this reissue specification; matter printed in italics indicates the additions made by reissue.

BACKGROUND OF THE INVENTION

The present invention is related to U.S. Pat. No. 4,063,050 entitled "Acoustic Transducer with Improved Electret Assembly" issued to E. V. Carlson and M. C. Killion and assigned to the same assignee as the present invention. The disclosure of said patent is incorporated herein by reference.

The invention relates to an acoustic transducer of the type comprising an electret assembly including a diaphragm positioned adjacent a backplate having an electret film formed thereon. The electret assembly is mounted within a case to form acoustic chambers on opposite sides of the diaphragm. The case includes a channel for permitting the external acoustic signal to enter into one of the acoustic chambers to enable the diaphragm to respond thereto. Openings are provided to permit the air pulsations created by the vibrations of the diaphragm to pass from one to the other acoustic chamber.

The electret comprises a dielectric film deposited on a backplate. The backplate includes protrusions which rest on support posts formed in the case to selectively space the dielectric film from the diaphragm. The electret assembly including the diaphragm and backplate are conveniently mounted on support posts formed in the case. The diaphragm extends across the interior of the case and separates the case into essentially two chambers.

The electret dielectric film is connected to suitable electronic circuitry to thereby permit electroacoustical interaction of the diaphragm and electret to provide an electrical signal representative of the acoustic signal. As is known, the converse operation may be provided by the transducer in that an electrical signal may be applied to the electret to cause the diaphragm to vibrate and thereby develop an acoustic signal which can be coupled out of the acoustic chamber.

SUMMARY OF THE INVENTION

The present invention is an improvement over the electret assembly disclosed in above-cited U.S. Pat. No. 4,063,050. In the present invention, the backplate and the included dielectric film surface are mounted in the opening of a support ring which in turn is mounted to the walls of the case. The backplate and dielectric film which form a charged fixed electrode are positioned within the support ring to provide a spacing between the edges of the backplate and the diaphragm. The spacing lowers undesired capacitance between the backplate electrode and the metalized diaphragm, which forms a movable electrode. The spacing also provides a means or way for the air between the diaphragm surface and the dielectrical material surface to escape into the other chamber of the case.

BRIEF DESCRIPTION OF THE DRAWINGS

The foregoing and other features, objects and advantages of the present invention will be apparent from the following more particular description of the preferred embodiment of the invention as illustrated in the accompanying drawings wherein.

DESCRIPTION OF THE INVENTION

Figure 1:
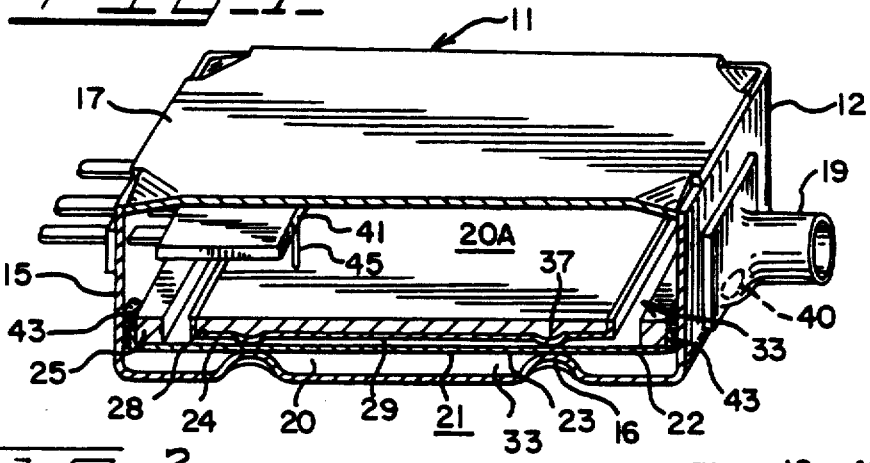
FIG. 1 is an isometric view, partially in cross section, of an electret transducer in accordance with the invention.
Figure 2:
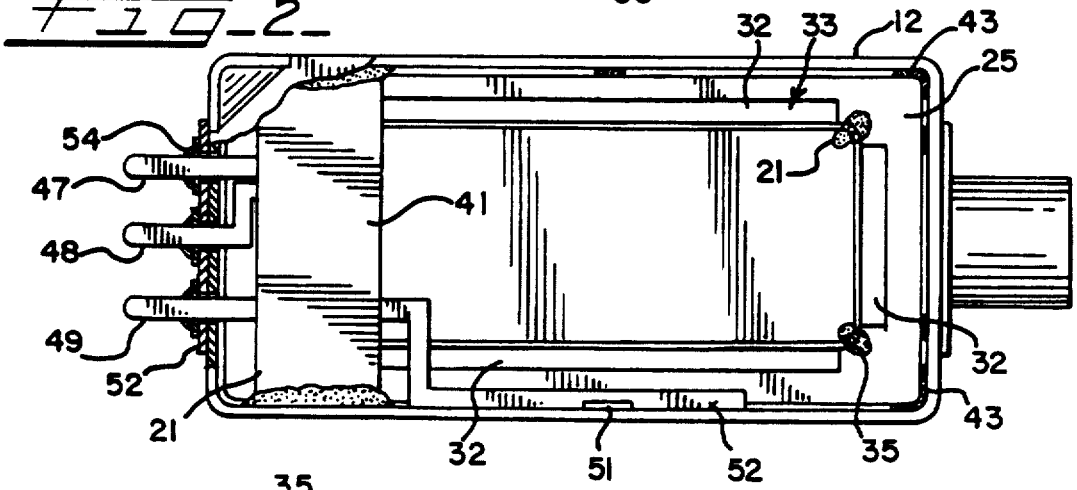
FIG. 2 is a plan view of case of FIG. 1 with portions thereof removed to show the mounting of the diaphragm support ring to the case, and of the backplate to the support ring.
Figure 3:
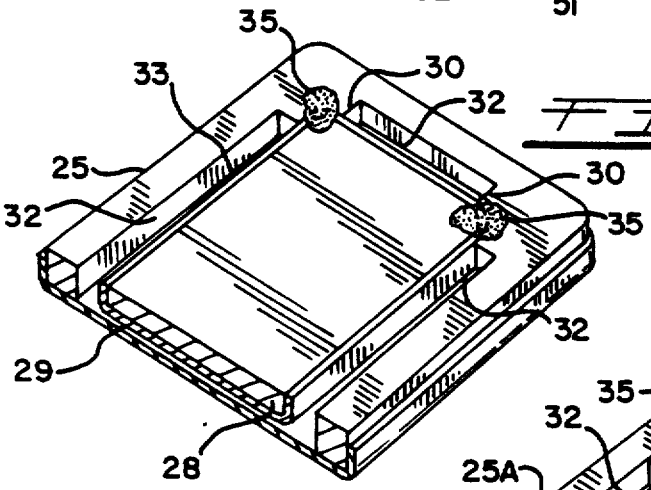
FIG. 3 is an isometric view further illustrating the mounting of the backplate to the support ring.

Referring to FIGS. 1, 2 and 3, the electret transducer 11 of the invention comprises a cup-like case, casing or housing 12 which, in the embodiment shown, has rectangular shaped walls 15. A mating cover or top 17 which comprises a generally flat plate fits atop the walls 15 and is cemented thereon to close the case 12. An acoustical signal input tube 19 mounted to case 12 communicates to the interior of case 12 through an acoustical opening, indicated generally as numberal 40 in end wall 15, and more particularly with acoustic chamber 20 formed in case 12. An electret transducer assembly 21 is mounted in case 12. The transducer assembly is generally of the type described in U.S. Pat. No. 4,063,050, cited above.

Electret assembly 21 includes a diaphragm 22 having a plate or flat portion 23 which extends across the relatively flat bottom or lower surface of case 12 and defines a lower acoustic chamber 20.

Diaphragm 22 may be of polyethylene terephthalate, commonly available under the trademark MYLAR, or of any similar material. The plate portion 23 of diaphragm 22 may be coated with a metallizing layer of conductive material 24, which may be evaporated on its surface. Diaphragm 22 comprises the movable electrode of the electret assembly 21.

A backplate 28, which has an dielectric film coating 29 thereon, is mounted in a support ring 25. Note that the relative thickness of film coating 29 is exaggerated in the drawings. The backplate 28 is rectangular in configuration with rounded corners and is mounted in the rectangular opening 32 of a support ring 25 (see FIGS. 2 and 3). The dimensions of the backplate are slightly smaller than the opening 32 of the support ring 25 for purposes to be explained. Backplate 28 comprises the fixed electrode of the electret assembly 21.

The support ring 25 is also rectangular in configuration, and its outer edges conform to the interior dimensions of the walls 15 of case 12. The support ring 25 is secured to the interior surface of the walls 15 such as by a bead of adhesive 43. The support ring 25, backplate 28 and diaphragm 22 define an upper acoustic chamber 20A in case 12.

The interior of the rectangular support ring 25 includes inwardly extending shoulders 30 with a curved inside rim to receive or conform to the rounded corners of the backplate 28. The backplate 28 thus is positioned within the opening of the support ring 25 and secured thereto by a nodule of cement 35 placed at the corner shoulders 30.

Projections or bumps 37 are provided on the lower surface of the backplate 28, as in the above cited patent, which define the relative spacing of the backplate to the diaphragm 22. The projections 37 cooperate with protrusions 16 in the facing portion of the case 12 to provide a reference for locating the assembly within the case 12. As described in the cited U.S. Pat. No. 4,063,050, the supporting posts 16 are formed as patterned indentations or discrete posts mounted in a pattern at the bottom or interior lower surface 33 of case 12. Posts 16 in the selected pattern configuration, align with corresponding protrusions 37 on the backplate 28 and are utilized to support and position the electret assembly 21 within the case 12. The posts 16 also accurately define the dimensions of the acoustic chamber 20 which is formed between the diaphragm 22 and the bottom of case 12.

In assembly, the diaphragm 22 is positioned adjacent to the backplate 28. As explained above, the spacing between the diaphragm plate portion 23 and the planar portions of backplate 28 is controlled by the protrusions 37 on backplate 28. The electret assembly or subassembly 21 comprising the backplate 28 and diaphragm 22 can then be inserted into the case 12 to rest on the posts 16 on the bottom of the case to thus form the acoustic chamber 20, as noted above.

A non-conductive ceramic plate 41 for containing or supporting the electronic circuitry is mounted within case 12 by suitable bracing and or cementing. One edge of plate 41 is mounted in the case 12 by means of the relatively rigid electrical terminals 47, 48 and 49 each of which have a portion affixed to plate 41 and an opposite portion which extends as by cementing to terminal pads 54 on the insulating board 52 mounted to wall 15 of case 12. The ends of the electrical terminals 47, 49 and 51 which are affixed to plate 41, also connect to the associated electronic circuitry, as disclosed in U.S. Pat. No. 4,063,050 which circuitry is mounted on plate 41. Numeral 51 indicates a grounding tab formed on diaphragm 22 for electrically connecting with terminal 49; and, reference numeral 52 indicates a weld point from terminal 49 to the case 12. Numeral 45 indicates a connection of backplate 28 to plate 41.

Importantly, and as mentioned above, in the present invention the spacing 32 is formed between the backplate 28 and support ring 25. The backplate 28 is smaller than the opening 33 of support ring 25. Thus other than at the corners, or at other selected supports, where the backplate 28 is affixed to the support ring 25, such as by cementing; the spacing 32 is formed around the backplate and the support ring. In previous constructions, and in contrast to the present invention, the material of the diaphragm 22, which forms the movable electrode, closely surrounds the sides of the backplate. This close spacing forms a capacitor that is in shunt with the movable portion 23 of the diaphragm 22, which is responsible for the function of the device. This parasitic capacitor shares the charge with active portion 23 of the diaphragm 22 thus reducing the signal voltage available as an output to the associated amplifier. In the present invention, the spacing 32 is provided between the edge of the backplate 28, fixed electrode and the diaphragm 22, movable electrode, to lower the undesired parasitic capacitance. Spacing 32 also provides a means for the air trapped between the diaphram surface and backplate electret surface to escape into the larger acoustical chamber 20A of the transducer case 12.

Figure 4:
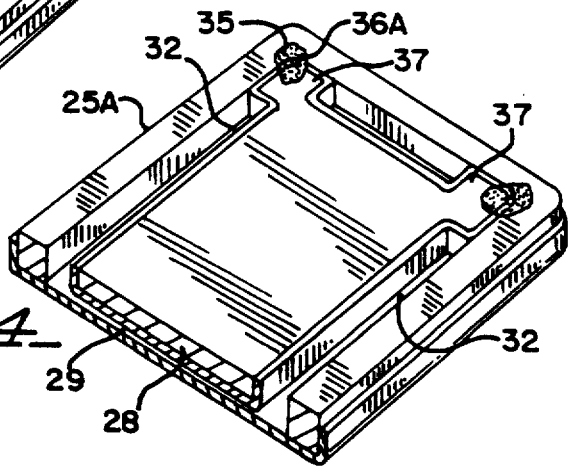
FIG. 4 shows an alternative embodiment of the support ring and the backplate.

A second embodiment of the invention is shown in FIG. 4 wherein the inside corners 36A of the support ring 25A form a 90° angle. In this embodiment, the backplate 28A is again smaller than the opening in support ring 25A and includes wings or extensions 37 on the corners thereof which conform to and abut the corners 36A of the support ring 25A. The backplate 28A is secured to the support ring 25A by a nodule of cement 35A placed at each of the corners of the support ring and the backplate to form the spacing 32.

While the invention has been particularly shown and described with reference to preferred embodiments thereof, it will be understood by those skilled in the art that various changes in form and details may be made therein without departing from the spirit and scope of the invention.

We claim:

[1. An acoustical transducer, comprising in combination, a case having a top, bottom and side walls; and electret assembly including a diaphragm having peripheral portions and a central vibratable plate portion forming a movable electrode, a diaphragm support ring having an opening thereon mounted in said case, the peripheral portions of said diaphragm being mountable to said support ring, a backplate mounted within the opening of said support ring to form a spacing between the backplate and the support ring, said backplate having a surface comprising a fixed electrode and cooperating with the diaphragm movable electrode to develop a signal, an acoustical chamber formed between the electret assembly and the bottom of said case, a second chamber formed between said assembly and the top of said case, said spacing between the backplate and the support ring lowering the capacitance between said electrodes, and said spacing enabling air movement between said chambers.]

[2. An acoustical transducer, comprising in combination, a case having a top, bottom and side walls; an electret assembly including a diaphragm having peripheral portions and a central vibratable plate portion having a conductive material thereon, a diaphragm support ring having an opening thereon mounted in said case, the peripheral portions of said diaphragm being mountable to said support ring, a backplate mounted within the opening of said support ring to form at least one spacing between the backplate and the support ring, an electret material, said backplate having a surface on which is electret material is positioned, said electret material cooperating with the diaphragm to develop a signal, support posts on the interior surface of the bottom of the case, protrusions on the surface of the backplate and aligned with said support posts for supporting the electret assembly in the case in spaced relation to the bottom of the case, an acoustical chamber formed between the electret assembly and the interior surface of the bottom of said case, a second chamber formed between said assembly and the top of said case, the spacing between the backplate and electret material and the support ring lowering the capacitance therebetween and hence the undesired capacitance affecting the electret assembly, and the spacing also providing a channel for air between the diaphragm and the electret material to escape into the second chamber of said casing.]

[3. An acoustical transducer as in claim 2 wherein said spacing extends substantially around said backplate.]

[4. An acoustical transducer as in claim 2 wherein said diaphragm includes a flange on its periphery, said flange conforming to the wall surface of the support ring, and means for adhering said flange to said ring.]

[5. An acoustical transducer as in claim 2 wherein the support ring includes shoulders or projections extending into said opening, and said backplate is affixed to said shoulders to provide said at least one spacing between the backplate and said ring.]

[6. An acoustical transducer as in claim 2 wherein said backplate includes wings or projections extending outwardly from the edges of said backplate for affixing said backplate to said support ring to form said at least one spacing.]

*7. An acoustical transducer comprising, in combination: a case; a diaphragm having peripheral mounting portions and a central vibrating plate portion forming a movable electrode, the peripheral mounting portions of said diaphragm being sealed in said casing to define separate first and second acoustic chambers on opposite sides thereof; backplate support means having an opening; a backplate in said second acoustic chamber confronting said diaphragm in close but spaced relation thereto, said backplate being mounted within said opening of said support means and secured thereto at spaced points and being unsecured thereto and spaced from the support means and casing between said spaced points of securement, said spacing between the backplate and support member and casing between said spaced points of securement extending substantially around the entire periphery of said backplate so as to substantially lower the capacitance between said backplate and the peripheral mounting portions of said diaphragm, the side of said backplate facing away from said diaphragm being spaced from a confronting side of said case to define a relatively large space communicating with the space between said backplate and diaphragm and constituting the major portion of the volume of said acoustic chamber on one side of said diaphragm, said backplate having a layer of electret material thereon and cooperating with said diaphragm to generate a signal therebetween upon movement of said diaphragm relative to said backplate or the diaphragm being moved relative to the backplate when a signal is applied therebetween; and a pair of electric terminals respectively coupled to said backplate and diaphragm for coupling a signal to or from the same.*

*8. An acoustical transducer as in claim 7 wherein there are support posts on the interior surface thereof upon which posts said diaphragm seats and protrusions on the surface of said backplate contacting said diaphragm outwardly of said central portion thereof and aligned with said support posts for supporting said diaphragm in an initial given spaced relation to the backplate.*

*9. An acoustical transducer as in claims 7 or 8 wherein said support means is a ring surrounding said opening therein, said diaphragm includes a flange on its periphery, said flange conforming to said peripheral surfaces of said support ring, and including means for adhering said flange to said ring.*

*10. An acoustical transducer as in claims 7 or 8 wherein said support means is a ring surrounding said opening therein, said support ring includes shoulders extending into said opening, and said backplate is affixed to said shoulders to provide said spacing between said backplate and said ring.*

*11. An acoustical transducer as in claims 7 or 8 wherein said support means is a ring surrounding said opening therein, said backplate includes projections extending outwardly from the edges of said backplate for affixing said backplate to said support ring and to form said spacing between said support ring and backplate.*

*12. An acoustical transducer as in claims 7 or 8 including port means for communicating sound between the outside of said case and said first acoustic chamber.*

*13. An acoustical transducer comprising, in combination: a case; a diaphragm having peripheral mounting portions and a central vibrating plate portion forming a movable electrode, the peripheral mounting portions of said diaphragm being sealed in said casing to define separate first and second acoustic chambers on opposite sides thereof; backplate support means having an opening; a backplate in said second acoustic chamber confronting said diaphragm in close but spaced relation thereto, said backplate being mounted within said opening of said support means and secured thereto at spaced points and being unsecured thereto and spaced from the support means and casing between said spaced points of securement, the side of said backplate facing away from said diaphragm being spaced from a confronting side of said case to define a relatively large space communicating with the space between said backplate and diaphragm and constituting the major portion of the volume of said acoustic chamber on one side of said diaphragm, said spacing between said backplate and support means and casing effecting communications between the space between said diaphragm and backplate and said relatively large space on the opposite side of said backplate to reduce back pressure on said diaphragm in said second acoustical chamber; said backplate having a layer of electret material thereon and said cooperating with said diaphragm either to generate a signal therebetween upon movement of said diaphragm relative to said backplate or the diaphragm being moved relative to the backplate when a signal is applied therebetween; and a pair of electric terminals respectively coupled to said backplate and diaphragm for coupling a signal to or from the backplate and diaphragm.*

*14. The transducer of claim 7 wherein said case has support posts on the interior surface thereof upon which posts said diaphragm seats, and protrusions on the surface of the backplate contacting said diaphragm outwardly of the central portion thereof and aligned with said support posts for supporting the diaphragm in an initial given spaced relation to the backplate.*

*15. An acoustical transducer as in claims 7 or 8 wherein said support means is a support ring surrounding said opening therein, said diaphragm includes a flange on its periphery, said flange conforming to the wall surface of the support ring, and means for adhering said flange to said ring.*

*16. An acoustical transducer as in claims 7 or 8 wherein said support means is a ring surrounding said opening therein, said support ring includes shoulders or projections extending into said opening of said ring, and said backplate is affixed to said shoulders to provide said spacing between the backplate and said ring.*

*17. An acoustical transducer as in claims 7 or 8 wherein said support means is a ring surrounding said opening therein, said backplate includes projections extending outwardly from the edges of said backplate for affixing said backplate to said support ring and to form said spacing between said support ring and backplate.*

*18. An acoustical transducer as in claims 7 or 8 including port means for communicating sound between the outside of said case and said first acoustic chamber.*

* * * * *